(12) United States Patent
Kitano

(10) Patent No.: US 8,051,325 B2
(45) Date of Patent: Nov. 1, 2011

(54) MULTIPROCESSOR SYSTEM AND FAILURE RECOVERING SYSTEM

(75) Inventor: Masaaki Kitano, Yamanashi (JP)

(73) Assignee: NEC Computertechno Ltd., Yamanashi (JP)

( * ) Notice: Subject to any disclaimer, the term of this patent is extended or adjusted under 35 U.S.C. 154(b) by 60 days.

(21) Appl. No.: 12/749,062

(22) Filed: Mar. 29, 2010

(65) Prior Publication Data

US 2010/0251005 A1 Sep. 30, 2010

(30) Foreign Application Priority Data

Mar. 30, 2009 (JP) ................. 2009-081353

(51) Int. Cl.
*G06F 11/00* (2006.01)
(52) U.S. Cl. ....................................................... 714/12
(58) Field of Classification Search ..................... 714/12
See application file for complete search history.

(56) References Cited

U.S. PATENT DOCUMENTS

| | | | | |
|---|---|---|---|---|
| 7,236,453 B2* | 6/2007 | Visser et al. | ................... | 370/219 |
| 7,493,432 B2* | 2/2009 | Fukazawa et al. | ............. | 710/74 |
| 7,769,921 B2* | 8/2010 | Hirayama | ....................... | 710/36 |
| 2001/0037475 A1* | 11/2001 | Bradshaw et al. | ............... | 714/15 |
| 2009/0287955 A1* | 11/2009 | Matsumoto et al. | ............... | 714/4 |

* cited by examiner

*Primary Examiner* — Amine Riad

(57) ABSTRACT

A multiprocessor system includes a plurality of nodes, each of which includes a plurality of processors, a plurality of memories, and first and second node controllers. Unique identifiers are assigned to all the components. Each of the first and second node controllers includes: each of first and second request control sections configured to determine the identifier of a transmission destination of a request based on a memory address of an access destination of the request; each of first and second registers configured to hold in the first request control section, the identifier of the transmission destination of the request; a first routing table configured to specify one of the first request control section and the second request control section as an output destination of the request based on the identifier held by the first register, the identifier held by the second register, the identifier of the transmission destination of the request, when receiving the request, and a second routing table configured to specify a signal line for the identifier of the transmission destination of the request based on the identifier of the transmission destination which is determined by the first request control section or the second request control section, to transmit the request.

15 Claims, 13 Drawing Sheets

Fig. 4

| ID | SIGNAL LINE | DESTINATION |
|---|---|---|
| 00000 | — | 101 |
| 00001 | 153 | 102 |
| 00010 | 154 | 103 |
| 00011 | 155 | 104 |
| 00100 | 151 | 121 |
| 00101 | 152 | 122 |

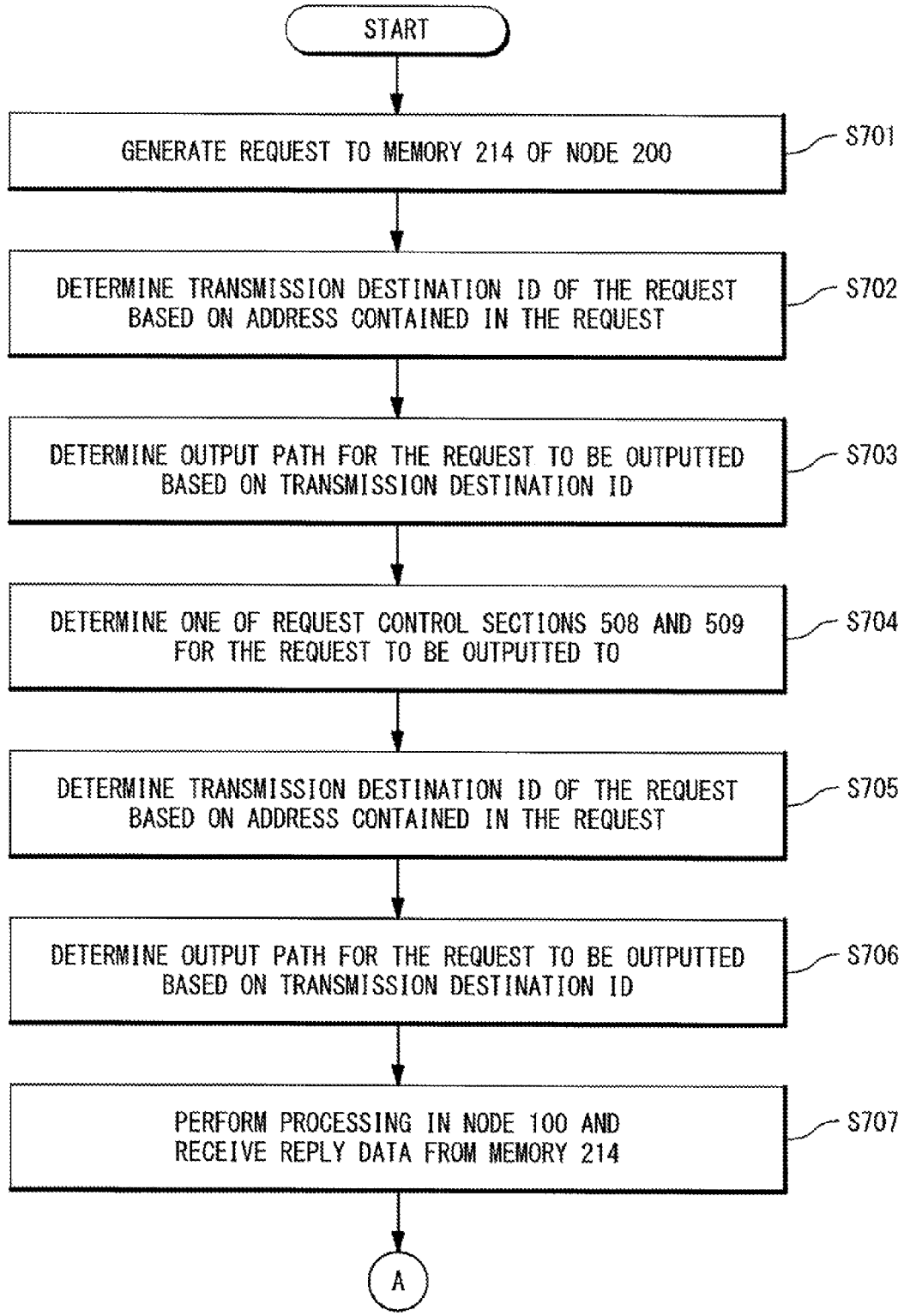

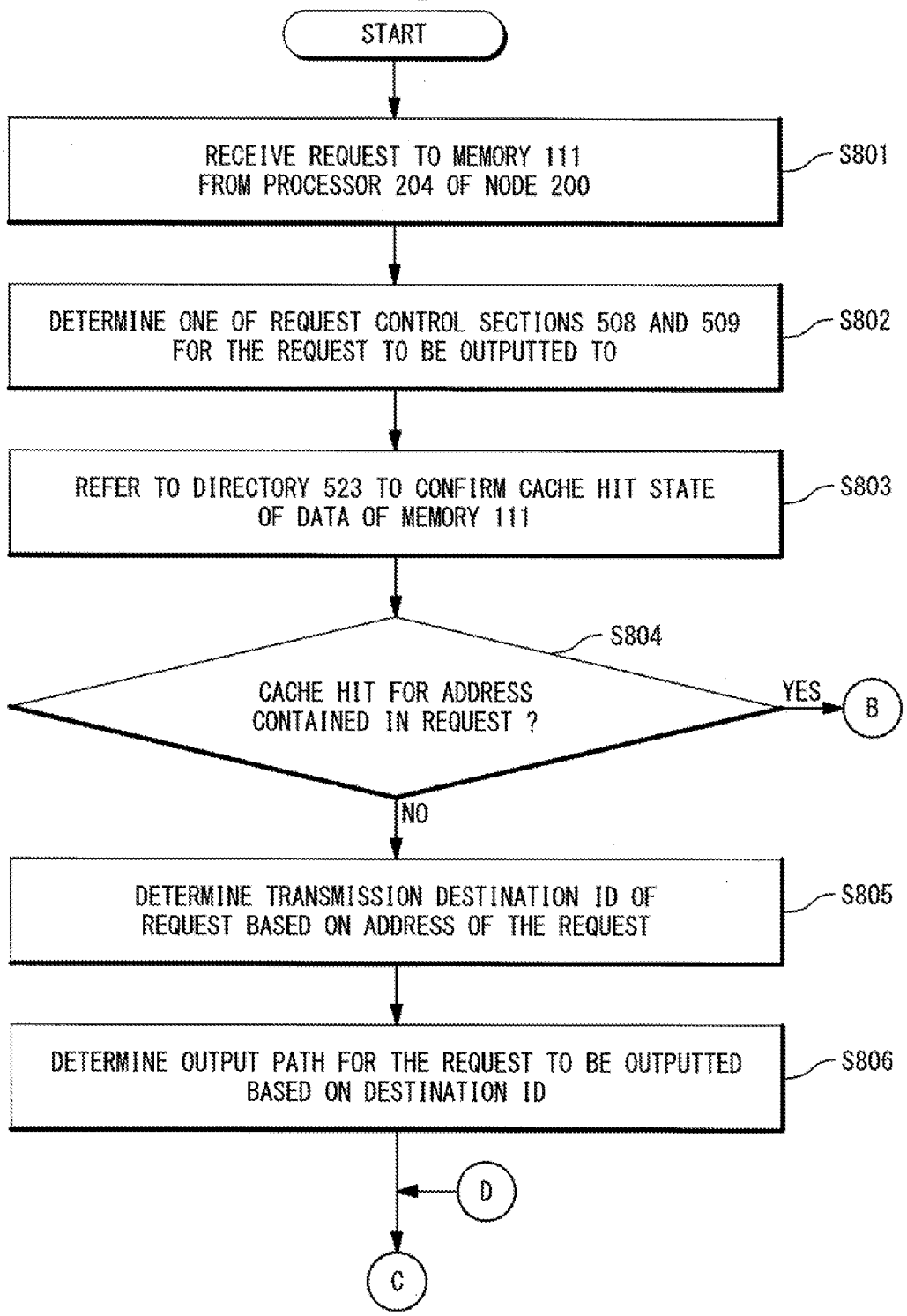

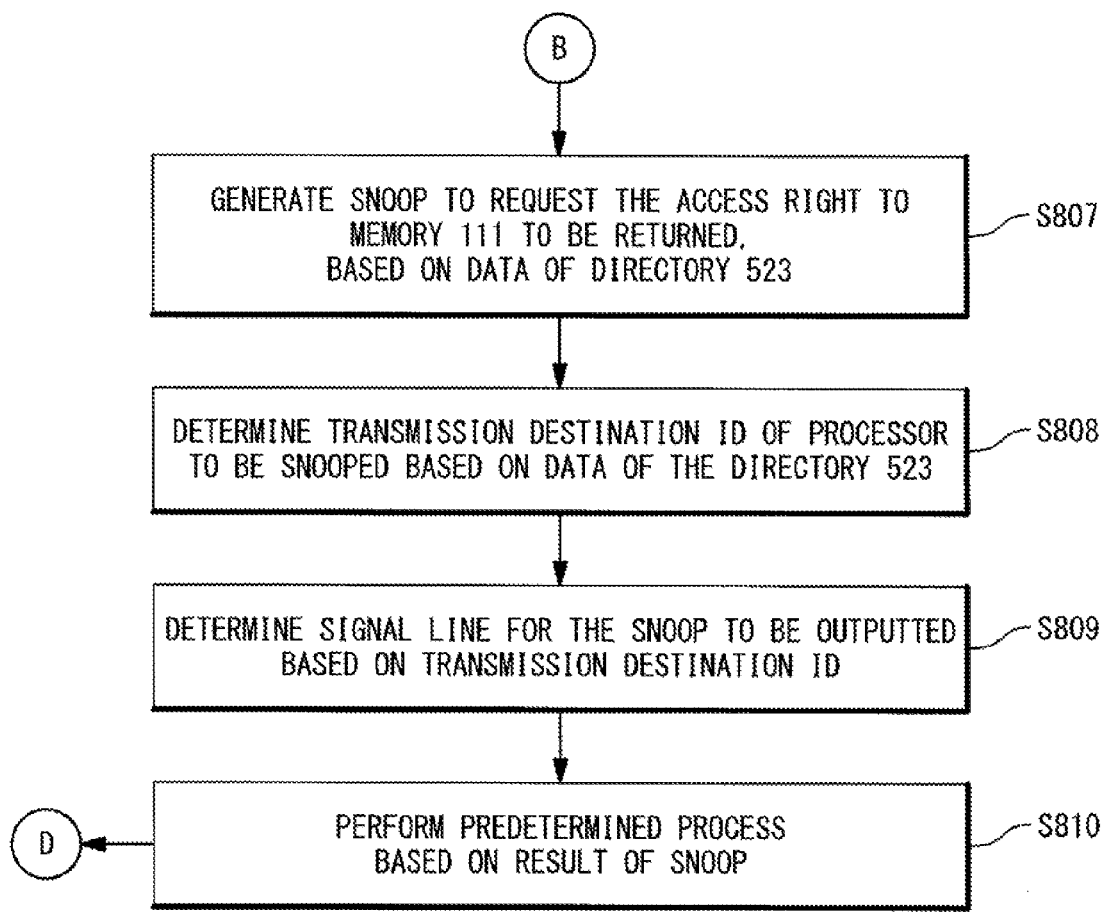

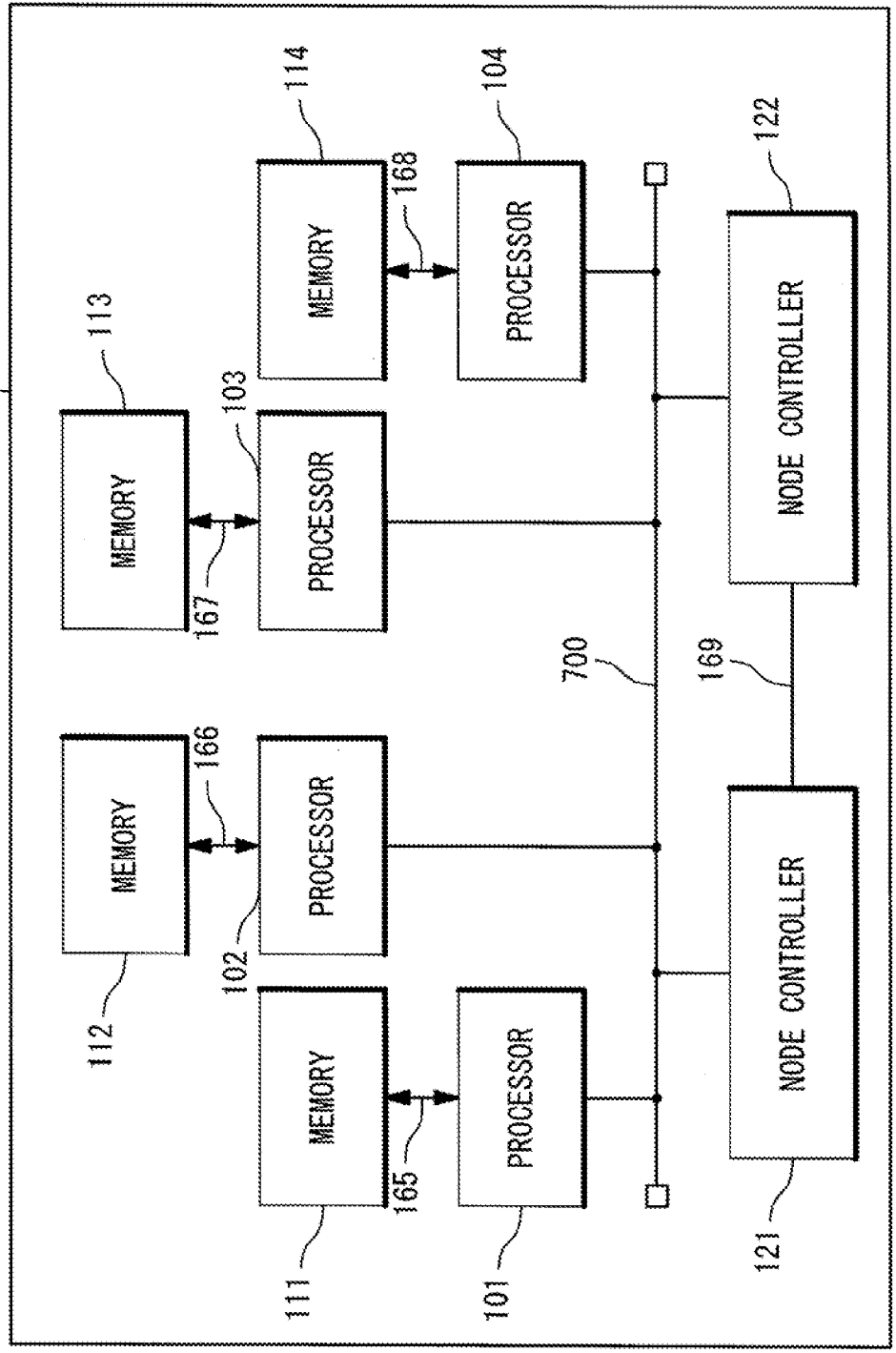

MULTIPROCESSOR SYSTEM AND FAILURE RECOVERING SYSTEM

INCORPORATION BY REFERENCE

The present application claims a priority on convention based on Japanese Patent Application No. 2009-081353. The disclosure thereof is incorporated herein by reference.

TECHNICAL FIELD

The present invention relates to a multiprocessor system.

BACKGROUND ART

In a multiprocessor system, redundant configuration is generally adopted by providing a plurality of node controllers. Therefore, even at a failure time of one node controller, an operation of the system can be continued by another node controller in which no failure has occurred. Conventionally, in order to prevent the down of system performance at the failure time of the node controller, it is required to change many settings of an address decoder, a routing table and so on of each node. Therefore, it takes a long time until the operation of the system is recovered, and particularly, a time required for the change of the setting cannot sometimes satisfy constraints of the system when the operation is continued without rebooting the system.

Japanese Patent Publication (JP-A-Heisei 4-321138A: patent literature 1) discloses a multiprocessor system in which there is no need for application to execute a special process even at a time of degeneracy operation due to a failure. This multiprocessor system connects a plurality of processors assigned with continuous identification data, through communication node elements having communication route data. The communication node elements change a communication route to a processor in which a failure has been detected into a new communication route to a normal processor, as if the identification data of the plurality of processors are continuous and the total number of processors is constant. Therefore, according to the multiprocessor system according to the patent literature 1, there is no need to execute a process, considering continuity of the processors and the total number of processors at the time of degeneracy operation of the system.

Also, Japanese Patent Publication (JP-A-Heisei 5-158840: a patent literature 2) discloses a frame relay communication processing system in an inter-processor communication control system that allows communication between processors connected to a communication controller even if a failure has occurred in any of duplex communication controllers connected to configured a duplex ring. In this frame relay communication processing system, when the failure has occurred in the communication controller corresponding to a different processor in a communication control system of each system so that direct communication by the communication system in each system between processors becomes impossible, communication from one processor corresponding to the failure occurred communication controller to another processor is performed by relaying a frame from one system of the normal communication controller to another system through processors in which the communication controllers of both systems are in the normal state. According to the frame relay communication processing system according to the patent literature 2, communication down between the processors including the failure occurred communication controller can be prevented by relaying transmission/reception of the frame by the processors having the communication controllers in which both systems are in the normal state in the case of a duplex failure in the network such as a ring configuration of the duplex ring communication controllers.

Japanese Patent Publication (JP-A-Heisei 5-175980A: patent literature 3) discloses an inter-system cross connectible communication control system which can maintain communication through the same communication bus without performing system change-over even if a failure has occurred in a common bus, a channel controller or the like. In the inter-system cross connectible communication control system according to the patent literature 3, common bus interface units are duplexed in each communication controller of a 0 system and a 1 system. One common bus interface unit is connected to a self-system ring bus through a self-system ring bus interface unit. Also, the other common bus interface unit is connected to another-system ring bus through another-system ring bus interface unit. The ring bus interface unit in each system usually selects the common bus interface unit connected to the self-system common bus, and selects the common bus interface device connected to the common bus of the other system when a failure has occurred in the common bus of the self-system, and performs communication through the ring bus of the self-system. According to the inter-system cross connectible communication control system according to the patent literature 3, even if the failure has occurred in the common bus of an active system, as long as the unit connected to the communication bus is in the normal state, communication can be continuously performed without changing over the system of the communication bus, by performing inter-system cross connectible communication with the other system.

Japanese Patent Publication (JP-A-Heisei 11-053331: a patent literature 4) discloses a distributed memory type multiprocessor system in which sufficient countermeasures for failure avoidance are taken to improve an operation rate of the system as a whole. In the distributed memory type multiprocessor system according to the patent literature 4, a plurality of processor configuration units, in each of which processors and local memories are connected by a local network, are connected by a global network to be mutually communicable. The processor configuration unit includes an I/O processor having an input/output function connected to a processor, a channel unit connected to the I/O processor, and a request transmission unit for degeneracy operation connected to the I/O processor and a bus. According to the distributed memory type multiprocessor system according to the patent literature 4, when the failure has occurred between the processor configuration unit and the global network, if there is no any failure in hardware in the processor configuration unit, sufficient failure countermeasures are taken so that the operation rate of the whole system can be improved without degenerating the failure occurred processor configuration unit while data transfer rate is reduced.

Citation List
Patent Literature 1: JP-A-Heisei 4-321138
Patent Literature 2: JP-A-Heisei 5-158840
Patent Literature 3: JP-A-Heisei 5-175980
Patent Literature 4: JP-A-Heisei 11-053331

SUMMARY OF THE INVENTION

An object of the present invention is to provide a multiprocessor system in which a system stop time period due to the failure in a node controller can be shortened.

In an aspect of the present invention, a multiprocessor system includes a plurality of nodes, and each of the plurality of nodes comprises the plurality of processors, a plurality of memories respectively connected to the plurality of processors, and first and second node controllers provided for a redundant configuration and connected with the plurality of processors. Unique identifiers are assigned to the plurality of processors, the first node controller and the second node controller in each node. Each of the first node controller and the second node controller includes: a first request control section configured to determine the identifier of a transmission destination of a request based on a memory address of an access destination of the request; a second request control section configured to determine the identifier of a transmission destination of a request based on a memory address of an access destination of the request; a first register configured to hold in the first request control section, the identifier of the transmission destination of the request to which the request should be outputted; a second register configured to hold in the second request control section, the identifier of the transmission destination of the request to which the request should be outputted; a first routing table configured to specify-one of the first request control section and the second request control section as an output destination of the request based on the identifier held by the first register, the identifier held by the second register, the identifier of the transmission destination of the request, when receiving the request; and a second routing table configured to specify a signal line for the identifier of the transmission destination of the request based on the identifier of the transmission destination which is determined by the first request control section or the second request control section, to transmit the request.

In another aspect of the present invention, a node controller assigned with a unique identifier and provided for a node, includes: a first request control section configured to determine the identifier of a transmission destination of a request based on a memory address of an access destination of the request; a second request control section configured to determine the identifier of the transmission destination of the request based on the memory address of the access destination of the request; a first register configured to hold in the first request control section, the identifier of the transmission destination of the request to be outputted; a second register configured to hold in the second request control section, the identifier of the transmission destination of the request to which the request should be outputted; a first routing table configured to specify one of the first request control section and the second request control section as an output destination of the request based on the identifier held by the first register, the identifier held by the second register, the identifier of the transmission destination of the request, when receiving the request; and a second routing table configured to specify a signal line for the identifier of the transmission destination of the request based on the identifier of the transmission destination which is determined by the first request control section or the second request control section, to transmit the request. Each of the plurality of nodes comprises the plurality of processors, a plurality of memories respectively connected to the plurality of processors, and first and second node controllers provided for a redundant configuration and connected with the plurality of processors, and identifiers are assigned to the plurality of processors, the first node controller and the second node controller in each node.

In still another aspect of the present invention, a failure recovering method is provided in a multiprocessor system which comprises a plurality of nodes, wherein each of the plurality of nodes comprises the plurality of processors, a plurality of memories respectively connected to the plurality of processors, and first and second node controllers provided for a redundant configuration and connected with the plurality of processors, and wherein unique identifiers are assigned to the plurality of processors, the first node controller and the second node controller in each node. The failure recovering method is achieved by determining by a first request control section, the identifier of a transmission destination of a request based on a memory address of an access destination of the request; by determining by a second request control section, the identifier of the transmission destination of the request based on the memory address of the access destination of the request; by holding by a first register, in the first request control section, the identifier of the transmission destination of the request to which the request should be outputted; by holding by a second register, in the second request control section, the identifier of the transmission destination of the request to which the request should be outputted; by specifying by a first routing table, one of the first request control section and the second request control section as an output destination of the request based on the identifier held by the first register, the identifier held by the second register, the identifier of the transmission destination of the request, when receiving the request; and by specifying by a second routing table, a signal line for the identifier of the transmission destination of the request based on the identifier of the transmission destination which is determined by the first request control section or the second request control section, to transmit the request.

According to the present invention, a multiprocessor system capable of shortening a system halt time owing to the failure of a node controller can be provided.

BRIEF DESCRIPTION OF THE DRAWINGS

The above and other objects, advantages and features of the present invention will be more apparent from the following description of certain embodiments taken in conjunction with the accompanying drawings, in which:

FIG. 4 is a diagram showing a routing table in the present exemplary embodiment;

FIGS. 7A and 7B show a flow chart of an operation flow of the node controller when a request is received from an internal unit of a node in the multiprocessor system according to the present exemplary embodiment;

FIGS. 8A to 8C show a flow chart of an operation flow of the node controller when a request is received from outside the node in the multiprocessor system according to the present exemplary embodiment;

FIG. 10 is a block diagram showing another modification example of the connection configuration in the node in the present exemplary embodiment.

DESCRIPTION OF EXEMPLARY EMBODIMENTS

Hereinafter, a multiprocessor system according to the present invention will be described in detail with reference to the attached drawings.

Figure 1:
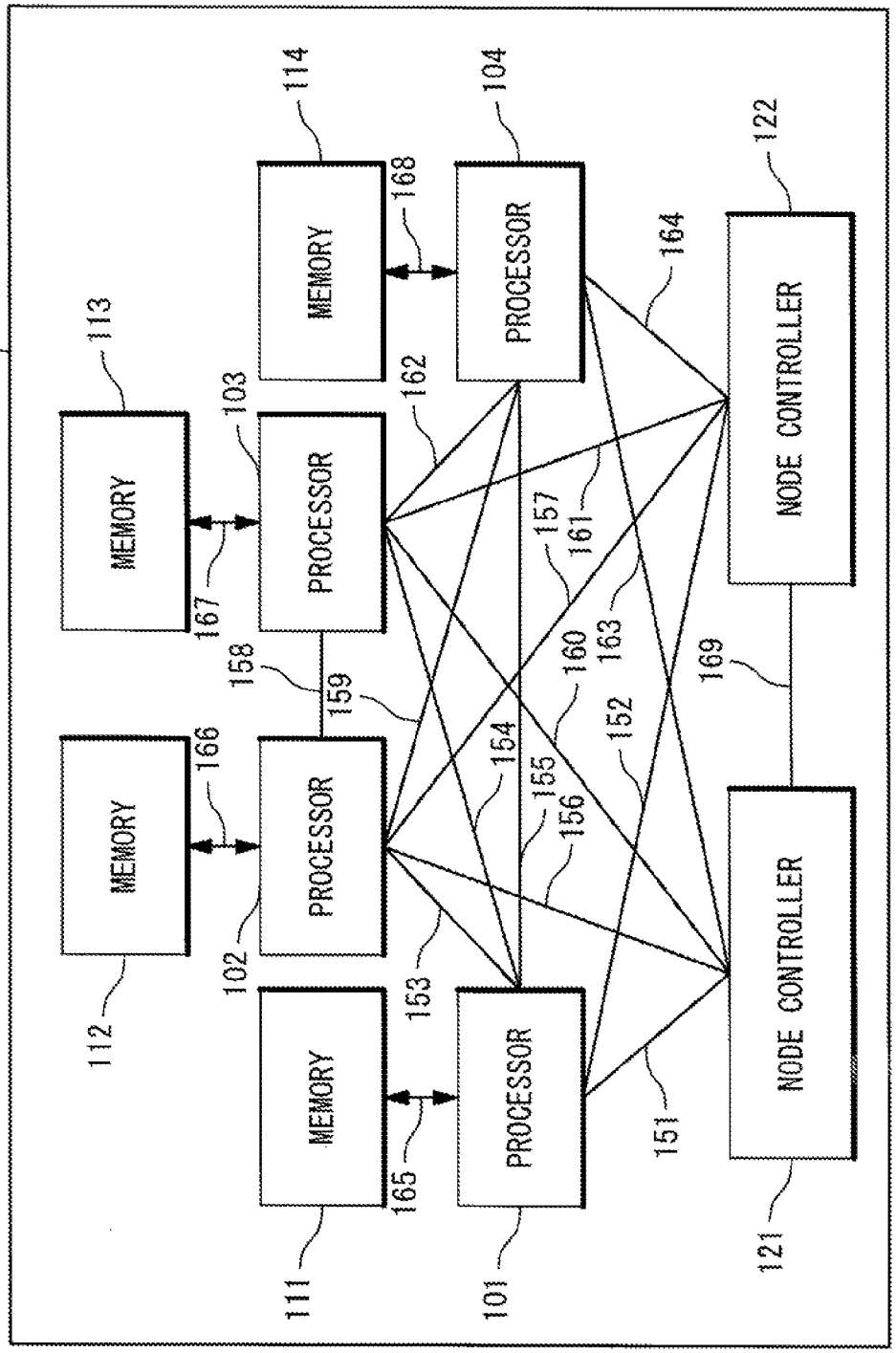
FIG. 1 is a block diagram showing a configuration of a node in a multiprocessor system according to an exemplary embodiment of the present invention.

FIG. 1 is a block diagram showing the configuration of a node of the multiprocessor system according to an exemplary embodiment of the present invention. Referring to FIG. 1, the multiprocessor system in the exemplary embodiment will be described. A node 100 in the present exemplary embodiment includes processors 101, 102, 103, and 104, memories 111, 112, 113, and 114, and node controllers 121 and 122. It should be noted that in the present exemplary embodiment, while the node 100 includes four processors and four memories, the numbers of processors and memories are not limited to 4, and may be more or less than 4. It should be also noted that in the present exemplary embodiment, the processors 101 to 104 and the node controllers 121 and 122 are assigned with unique ID data, respectively. The processors 101 to 104 store the ID data of only the processors 101 to 104 and the node controllers 121 and 122 in the node 100. The node controllers 121 and 122 may store ID data of not only the processors 101 to 104 and the node controllers 121 and 122 in the node 100, but also ID data of the node controllers of other nodes to be described later. Therefore, each of the processors 101 to 104 transmits a request to the node controller 121 or 122 so that the node controller 121 or 122 transfers the request, when accessing to processors and node controllers outside of the node 100.

The processor 101 is connected to the memory 111 by a signal line 165. The processor 102 is connected to the memory 112 by a signal line 166. The processor 103 is connected to the memory 113 by a signal line 167. The processor 104 is connected to the memory 114 by a signal line 168. Further, the processor 101 is connected to the node controller 121 by a signal line 151, and is connected to the node controller 122 by a signal line 152. Further, the processor 101 is connected to the processors 102 to 104 by signal lines 153 to 155, respectively. The processor 102 is connected to the node controller 121 by a signal line 156, and is connected to the node controller 122 by a signal line 157. Further, the processor 102 is connected to the processors 101, 103, and 104 by signal lines 153, 158, and 159, respectively. The processor 103 is connected to the node controller 121 by a signal line 160, and is connected to the node controller 122 by a signal line 161. Further, the processor 103 is connected to the processors 101, 102, and 104 by signal lines 154, 158, and 162, respectively. The processor 104 is connected to the node controller 121 by a signal line 163, and is connected to the node controller 122 by a signal line 164. Further, the processor 104 is connected to the processors 101, 102, and 103 by the signal lines 155, 159, and 162, respectively.

The processors 101 to 104 cache data of the memories 111 to 114, respectively. It should be noted that each of the processors 101 to 104 may cache the data of each of the memories 111 to 114 in the node 100 except for a corresponding one of the memories 111 to 114. Further, the processors 101 to 104 may cache data of memories provided in a node outside of the node 100 and not shown in FIG. 1 to be described later.

The memories 111 to 114 are accessed by the processors 101 to 104 in units of cache lines, respectively. The data width of one cache line is constant, for example, 64 bytes. The processors 101 to 104 determine positions of the cache lines based on an address designated at the time of the memory access. It should be noted that the data of the memories 111 to 114 can be cached by processors provided outside the node 100 (not shown in FIG. 1).

The node controllers 121 and 122 determine an access destination when the processors 101 to 104 in the node 100 access to units outside the node 100 or when processors outside the node 100 access to units inside the node 100. The node controllers 121 and 122 are connected to each other by a signal line 169. The node controller 121 and the node controller 122 are provided with the same function so that they are configured to have a redundant configuration. It should be noted that the processor 101 and the node controllers 121 and 122 will be described further in detail later.

Figure 2:
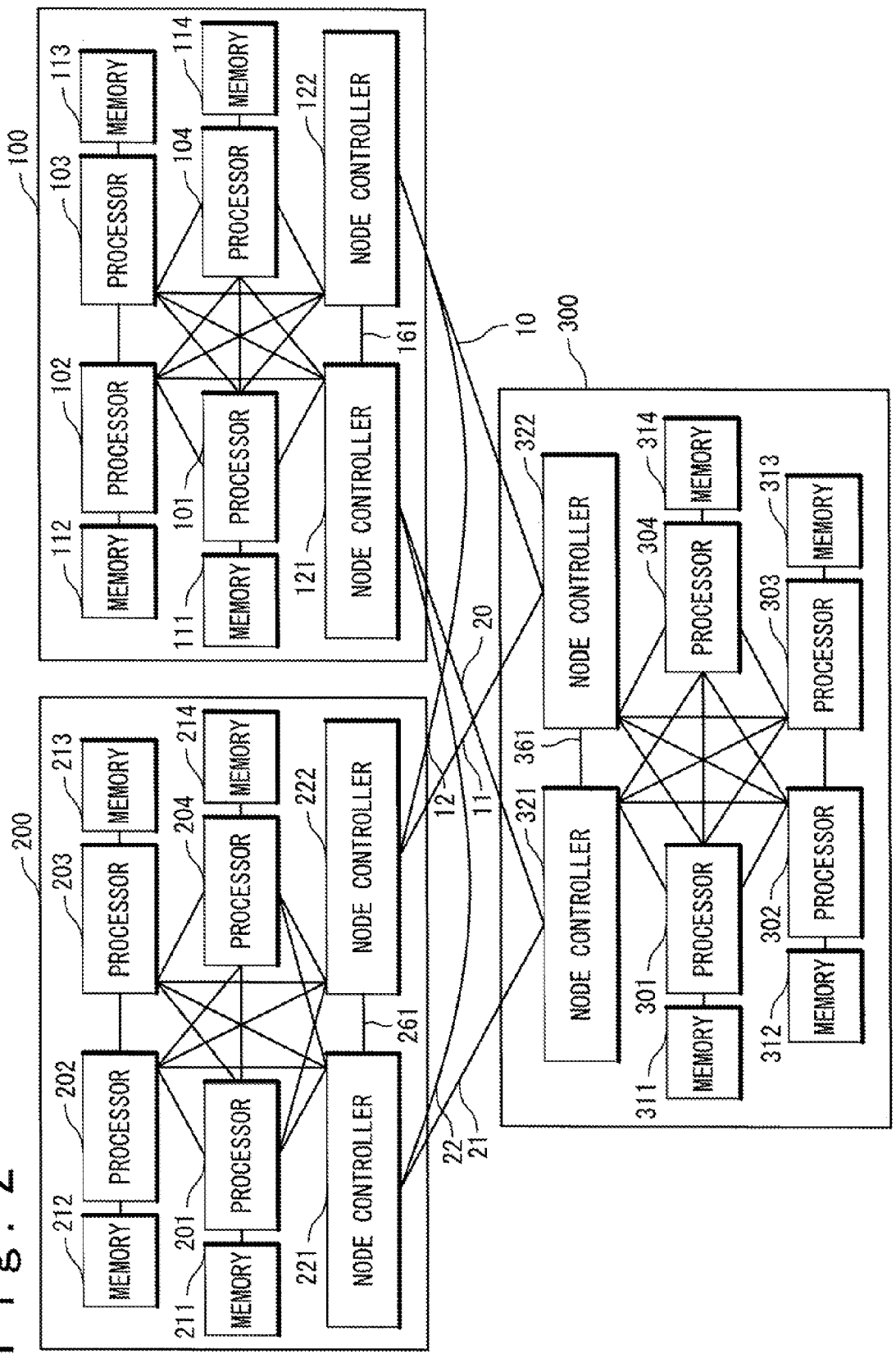
FIG. 2 is a block diagram showing a connection relation between the nodes in the multiprocessor system of the present exemplary embodiment.

Next, a connection relation between the nodes in the multiprocessor system according to the present exemplary embodiment will be described with reference to FIG. 2. FIG. 2 is a diagram showing the connection relation between the nodes in the multiprocessor system according to the present exemplary embodiment. The multiprocessor system according to the present exemplary embodiment includes a node 200 and a node 300 which have the same configuration as the node 100. The node 200 includes processors 201 to 204, memories 211 to 214, and node controllers 221 and 222. Further, the node 300 includes processors 301 to 304, memories 311 to 314, and node controllers 321 and 322. The connection relations between components in the node 200 and the node 300 are the same as the node 100, and therefore, the description thereof will be omitted. The node controllers 121, 221, and 321 are mutually connected in one-to-one correspondence by using signal lines 20, 21, and 22. Moreover, the node controllers 122, 222, and 322 are mutually connected in one-to-one correspondence by using signal lines 10, 11, and 12. An access between the node controllers not mutually connected uses signal lines 161, 261, and 361 which connect between the node controllers in the respective nodes 100, 200, and 300. For example, when an access is made from the node controller 121 to the node controller 222, the access can be made through the signal line 161, the node controller 122, and a signal line 12 or through a signal line 22, the node controller 221, and the signal line 261. It should be noted that the node 200 and the node 300 have the same configuration as the node 100, and therefore, the same description thereof will be omitted.

Figure 3:
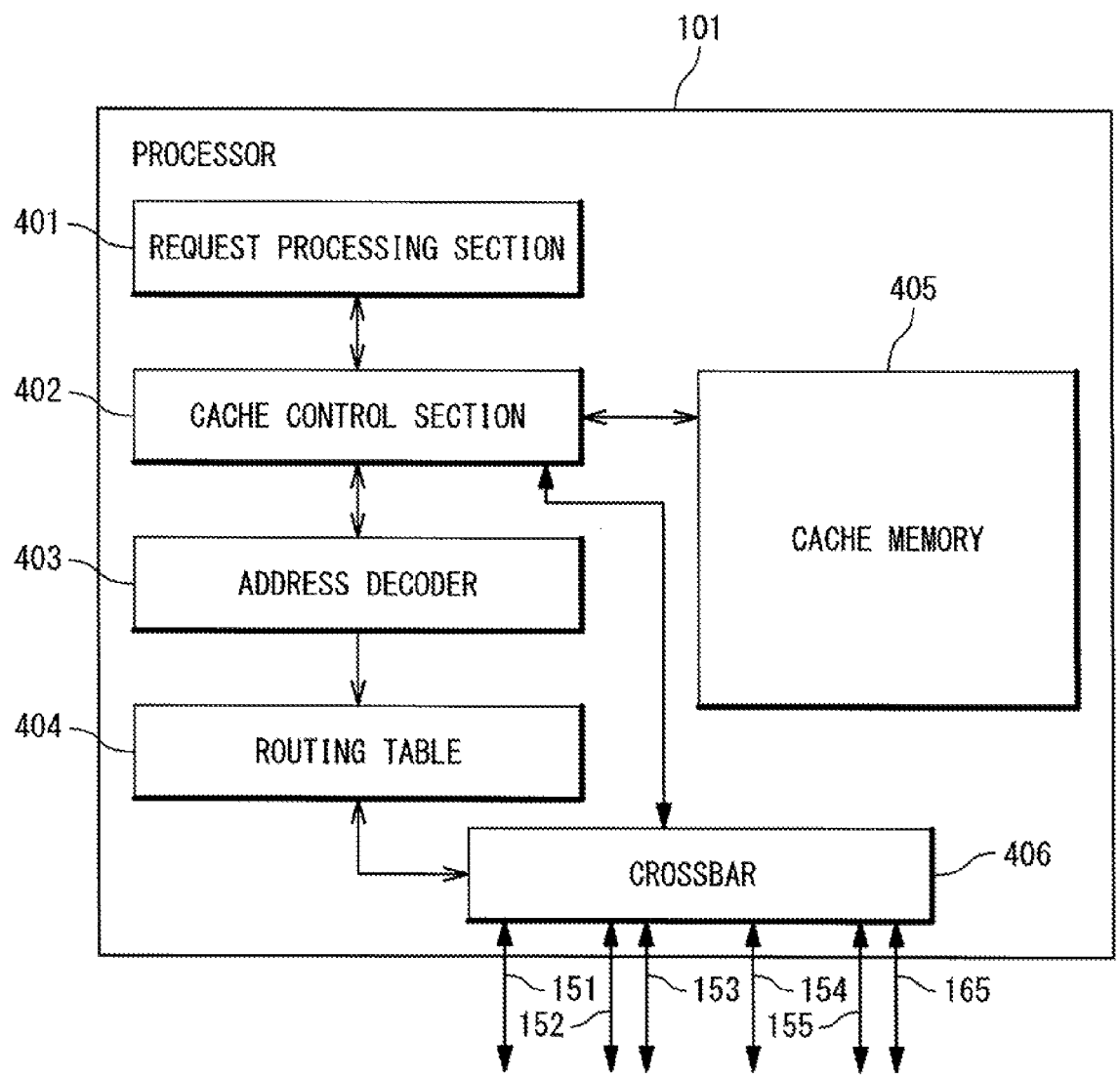
FIG. 3 is a block diagram showing a configuration of a processor in the present exemplary embodiment.

Next, the configuration of the processor 101 in the present exemplary embodiment will be described with reference to FIG. 3. FIG. 3 is a block diagram showing the configuration of the processor 101 in the present exemplary embodiment. It should be noted that other processors 102 to 104 provided in the node 100, processors 201 to 204 provided in the node 200, and processors 301 to 304 provided in the node 300 have also the same configuration, and therefore, the same description thereof will be omitted.

The processor 101 includes a request processing section 401, a cache control section 402, an address decoder 403, a routing table 404, a cache memory 405, and a crossbar 406.

The request processing section 401 is connected to the cache control section 402. The request processing section 401 generates a read access command for reading data from a memory and a write access command for writing data into a memory. The request processing section 401 generates each command in response to a command from a process executed on the processor 101. The request processing section 401 outputs the generated command to the cache control section 402.

The cache memory 405 is connected to the cache control section 402. The cache memory 405 is a cache memory which adopts a general cache protocol such as MESI (Modified, ExClusive, Shared, Invalid). The processor 101 can temporarily store the data of the memory 111 in the cache memory 405 of the processor 101.

The cache control section 402 controls an access to the cache memory 405. The cache control section 402 is connected to the request processing section 401, the address decoder 403, the cache memory 405, and the crossbar 406. The cache control section 402 determines whether it holds an access right to the cache line of an access destination, based on the address of the access destination described in a command when the command is inputted from the request processing section 401. The cache control section 402 takes out data from the cache line of the cache memory 405 when it holds the access right to the cache line of the address of the access destination at a read access time, and outputs the taken-out data to the request processing section 401. On the other hand, the cache control section 402 generates a read request and outputs it to an address decoder 403 when not holding the access right to the cache line of the address of the access destination at a read access time. Further, the cache control section 402 takes out data from the cache line of the cache memory 405 and merges the data at a write access time. The cache control section 402 generates a write request for writing back the data of the cache memory 405 into the memory, according to need, and outputs the write request to the address decoder 403 together with the data, based on a request sent from the request processing section 401 or a request sent from the processor outside of the node 100 through the crossbar 406. Further, the cache control section 402 holds the presence or absence of the access right to the cache line by the processor when the access right to the cache line of the cache memory 405 is received from the processor outside the node 100 through the crossbar 406. In accordance with the access through the crossbar 406 from the processor, the cache control section 402 stores the data into the cache memory 405 or outputs the data to the request processing section 401.

The address decoder 403 is connected to the cache control section 402 and the routing table 404. The address decoder 403 includes registers indicating address ranges assigned to the memories 112 to 114 in the node 100, the memories 211 to 214 provided in the node 200, and the memories 311 to 314 provided in the node 300, respectively. The address decoder 403 specifies a memory provided with the address range to which a concerned address belongs, based on the concerned address included in the request sent from the cache control section 402, and specifies an ID data of the processor or node controller corresponding to the memory. The address decoder 403 outputs the ID data of the processor or node controller to the routing table 404 together with the request.

The routing table 404 is connected to the address decoder 403 and the crossbar 406. The routing table 404 stores the routing data on a signal line corresponding to each of the ID data of the processors and node controllers. The routing table 404 specifies a signal line for a read request to be outputted onto, based on the ID data sent from the address decoder 403.

FIG. 4 is a diagram showing the routing table 404 in the present exemplary embodiment. The routing table 404 stores a set of the ID data of the processors or node controllers, the signal line of the output destination, the names of the processors or the node controllers corresponding to the ID data. In the present exemplary embodiment, the ID data assigned to the processor or node controller has five bits. Upper two bits of the ID data (first bit and second bit) indicate a node number. For example, "00" indicates the node 100, "01" indicates the node 200, and "10" indicates the node 300, respectively. The lower bit thereof (third bit) indicate either the processor or node controller. For example, "0" indicates the processor, and "1" indicates the node controller. Lower two bits of the ID data (fourth bit and fifth bit) indicate a number assigned to each of the processor and node controller. By taking the node 100 as an example, "00000" indicates the processor 101, "00001" indicates the processor 102, "00010" indicates the processor 103, and "00011" indicates the processor 104. Further, "00100" indicates the node controller 121, and "00101" indicates the node controller 122. For example, the address decoder 403 determines the ID data as "00001" when a certain request indicating the address range of the processor 102 is received. The routing table 404 specifies a signal line for an output destination of the request as the "signal line 153", based on the ID data "00001". Similarly, if the ID data corresponding to the processor 103 is "00010", the output destination is determined as the "signal line 154", and if the ID data corresponding to the processor 104 is "00011", the output destination is determined as the "signal line 155". It should be noted that the ID data shown in FIG. 4 is an example, and is not restricted to the present example.

The crossbar 406 outputs a request and a reply onto the signal lines 151 to 155 and 165. The crossbar 406 is connected to the cache control section 402 and the routing table 404. Further, the crossbar 406 is connected to the memory 111, the processors 102 to 104, and the node controllers 121 and 122 through the signal lines 151 to 155 and 165. The crossbar 406 outputs a request generated by a request processing section 401 onto the signal line specified by the routing table 404. Further, the crossbar 406 outputs a request sent from any of the signal lines 151 to 155 and 165 and a reply to the request to the cache control section 402. Further, the crossbar 406 outputs a reply of the cache memory 405 sent from the cache control section 402 onto the signal lines 151 to 155 and 165. Further, when the request sent from another processor is not an access to the processor 101, the crossbar 406 outputs the ID data contained in the request to the routing table 404, specifies a signal line of an output destination by the routing table 404; and transfers the request onto the specified signal line.

Figure 5:
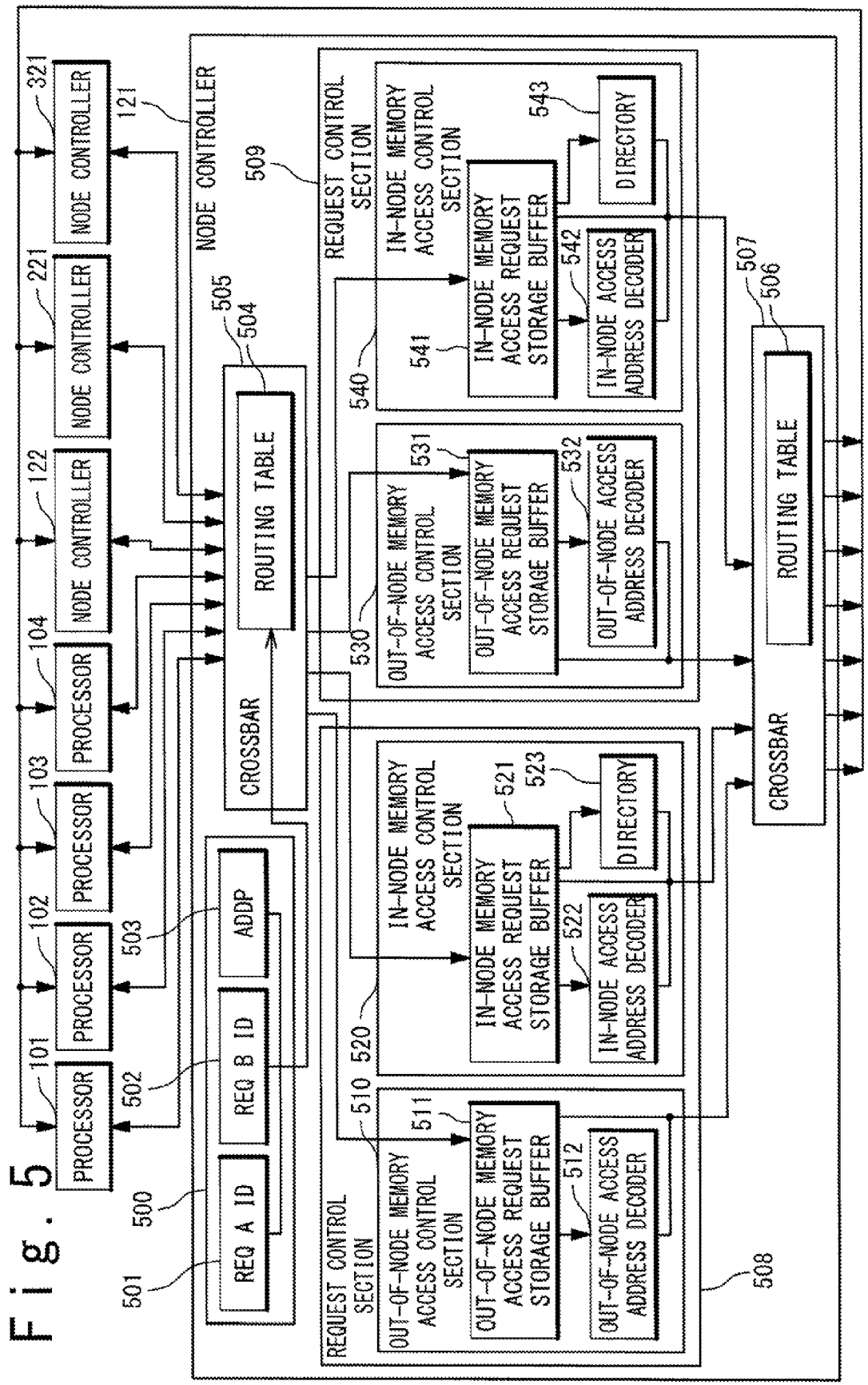
FIG. 5 is a block diagram showing a configuration of a node controller in the present exemplary embodiment.

Next, the node controller 121 or 122 in the present exemplary embodiment will be described with reference to FIG. 5. It should be noted that the node controller 121 and the node controller 122 have the same configuration, and therefore, the node controller 121 only will be described and the description of the node controller 122 will be omitted. Further, the node controllers 221 and 222 provided in the node 200 and the node controllers 321 and 322 provided in the node 300 have also the same configuration, respectively, and therefore, the description thereof will be omitted. FIG. 5 is a diagram showing the configuration of the node controller 121 in the present exemplary embodiment. The node controller 121 in the present exemplary embodiment includes a request distribution data register section 500, routing tables 504 and 506, crossbars 505 and 507, and request control sections 508 and 509.

The request distribution data register section 500 includes registers 501, 502, and 503. The registers 501, 502, and 503 are connected to a routing table 504. The registers 501, 502, and 503 determine whether a request received by the node controller 121 is to be distributed to the request control section 508 or the request control section 509. The register 501 sets a transmission destination ID data to be distributed to the request control section 508. For example, when the transmission destination ID data of the request is an ID data set in the register 501, the request is transferred to the request control section 508. Similarly, the register 502 sets a transmission destination ID data to be distributed to the request control section 509. For example, when the transmission destination ID data of the request is an ID data set in the register 502, the request is transferred to the request control section 509. The ID data set in the registers 501 and 502 are outputted to the routing table 504 as data for deciding the output destination of the request. Further, the register 503 sets bit positions for performing address interleave. The bit position set in the register 503 is outputted to the routing table 504 in order to perform the sorting of the address interleave. In the present exemplary embodiment, the registers 501 and 502 are a register of five bits, and the register 503 is a register of six bits. It should be noted that the number of bits of the registers 501, 502, and 503 are not limited to these values. The number of bits of the registers 501, 502, and 503 varies according to the ID data assigned to the processor and the node controller.

The routing table 504 is formed to have the same configuration as the routing table 404 provided in the processor 101. The routing table 504 is connected to the registers 501, 502, 503, and the crossbar 505. The routing table 504 specifies output destinations of the requests sent from the processors 101 to 104 and the node controllers 122, 221, and 321 based on data set in the registers 501 to 503 of the request distribution data register section 500 and routing data of FIG. 4 set in the routing table 504. The routing table 504 takes out transmission destination ID data included in the requests sent from the processors 101 to 104 connected to the node controller 121, and the node controllers 122, 221, and 321, and compares them with the ID data set in the registers 501 and 502 of the request distribution data register section 500. When the transmission destination ID data of the request is coincident with the ID data set in either the register 501 or the register 502, the routing table 504 outputs the request to the request control section corresponding to the coincident ID data. Further, when the transmission destination ID data of the request is coincident with any ID data set in the registers 501 and 502, the routing table 504 compares the addresses of the bit position of the address interleave set in the resistor 503, and determines a request control section as an output destination. Further, when the transmission destination ID data of the request is not coincident with any ID data set in the resistor 501 and the register 502, the routing table 504 specifies the request as a request accessing to other node, and determines signal lines to the processors 101 to 104 connected to the node controller 121, and the node controllers 122, 221, and 321 by referring to the routing data shown in FIG. 4 based on the transmission destination ID data.

For example, when the transmission destination ID data included in the request is "00100", and both of the register 501 and the register 502 are set to "00100", the routing table 504 refers to the bit position set in the register 503. For example, when the register 503 is set to "000111", the request control section outputting the request is determined by comparing with the "bit 7" of the address. Further, when the transmission destination ID data included in the request is "00100" and the register 501 is set to "00100" and the register 502 is set to "00101", the routing table 504 specifies the request control section 508 as an output destination of the request. On the other hand, when a table state of the routing table 504 is in a state shown in FIG. 4 and the transmission destination ID data included in the request is "00001" and the register 501 is set to "00100" and the register 502 is set to "00101", the routing table 504 specifies that the transmission destination ID data is not coincident with any ID data of the register 501 and the register 502. The routing table 504 specifies the signal line 153 to the processor 102 corresponding to the transmission destination ID data of the request as an output destination of the request by referring to the routing data.

The crossbars 505 and 507 output the received requests to the signal lines specified by the respective routing tables 504 and 506. The crossbar 505 is connected to the routing table 504 and the request control sections 508 and 509. Further, the crossbar 505 is connected to the processors 101 to 104 and the node controller 122 in the node 100, and the node controller 221 of the node 200 and the node controller 321 of the node 300 through the signal lines. Further, the crossbar 507 is connected to the routing table 506 and the request control sections 508 and 509. Further, the crossbar 505 is connected to the processors 101 to 104 and the node controller 122 in the node 100, the node controller 221 of the node 200, and the node controller 321 of the node 300 through the signal lines.

The request control section 508 includes an out-of-node memory access control section 510 and an in-node memory access control section 520. Further, the request control section 509 includes an out-of-node memory access control section 530 and an in-node memory access control section 540. The request control section 509 is formed to have the same configuration as the request control section 508, and therefore, the repetitive description thereof will be omitted.

The out-of-node memory access control section 510 includes an out-of-node memory access request storage buffer 511 and an out-of-node access address decoder 512. The out-of-node memory access request storage buffer 511 is connected to the crossbars 505 and 507 and the out-of-node access address decoder 512. Further, the address decoder 512 is connected to the crossbar 507. The out-of-node memory access request storage buffer 511 stores requests when the processors 101 to 104 in the node 100 perform an access to the memory provided outside the node 100. The address decoder 512 identifies an ID data of the node controller as the output destination based on an address included in the request sent from the out-of-node access request storage buffer 511. Further, the ID data identified by the address decoder 512 is transmitted to the routing table 504 together with the request in order to allow the routing table 504 to be referred to for the'transfer destination of the request when the crossbar 505 receives the request.

The out-of-node memory access control section 510 takes out the address from the request stored in the out-of-node memory access request storage buffer 511, and outputs it to the out-of-node access address decoder 512. The out-of-node access address decoder 512 identifies an ID data of the node controller as the output destination based on the address included in the request sent from the out-of-node memory access request storage buffer 511. The out-of-node memory access control section 510 outputs the ID data identified by the out-of-node access address decoder 512 and the request having been stored in the out-of-node memory access request storage buffer 511 to the crossbar 507.

The in-node memory access control section 520 includes an in-node memory access request storage buffer 521, an in-node access address decoder 522, and a directory 523. The in-node memory access request storage buffer 521 is connected to the crossbars 505 and 507, the in-node access address decoder 522, and the directory 523. The in-node access address decoder 522 and the directory 523 are further connected to the crossbar 507. The in-node memory access request storage buffer 521 stores requests for accessing the memories 111 to 114 provided in the node 100 from the processor outside the node 100. The in-node access address decoder 522 identifies an ID data of the processor of the output destination of the request based on a request sent from the in-node memory access request storage buffer 521. Further, the ID data identified by the in-node access address decoder 522 is transferred to the routing table 504 together with the request in order to allow the routing table 504 to be referred to for the transfer destination of the request when the crossbar 505 receives the request. The directory 523 manages status data for each of lines of the memories 111 to 114 in the node 100. The status data relates data indicating whether the data stored in the memories 111 to 114 are cached by the processor in another node, with the ID data of the caching processor and address data for cached data of the memories 111 to 114 when the data is subjected to data cache, and then records them. The directory 523 is recorded with all the address data of the memories 111 to 114 of the node 100 cached by the processor outside the node 100.

The in-node memory access control section 520 takes an address from the request stored in the in-node memory access request storage buffer 521, and outputs it to the in-node access address decoder 522 and the directory 523. The in-node access address decoder 522 identifies an ID data of the processor as the output destination of the request based on the address sent from the inter-memory access request storage buffer 521. The in-node memory access control section 520 outputs the ID data of the processor identified by the in-node access address decoder 522 and the request having been stored in the in-node memory access request storage buffer 521 to the crossbar 507. The directory 523 stores an ID data of the processor as an access source, an ID data of the processor as the access destination, and address data of the memories 111 to 114 to be cached. Further, the in-node memory access control section 520 generates a snoop requesting the return of the access right to the cache line for the processor caching the data of the memories 111 to 114 recorded in the directory 523, and outputs it to the crossbar'507.

The routing table 506 specifies a signal line for outputting the request outputted from the out-of-node memory access control section 510 based on the ID data of the transfer destination outputted from the out-of-node access address decoder 512. Further, the routing table 506 specifies a signal line for outputting the request outputted from the in-node memory access control section 520 based on the ID data of the transfer destination outputted from the in-node access address decoder 522. The routing table 506 is connected to the crossbar 507. The routing table 506 notifies the specified signal line to the crossbar 507.

[Operation Method]

Figure 6:
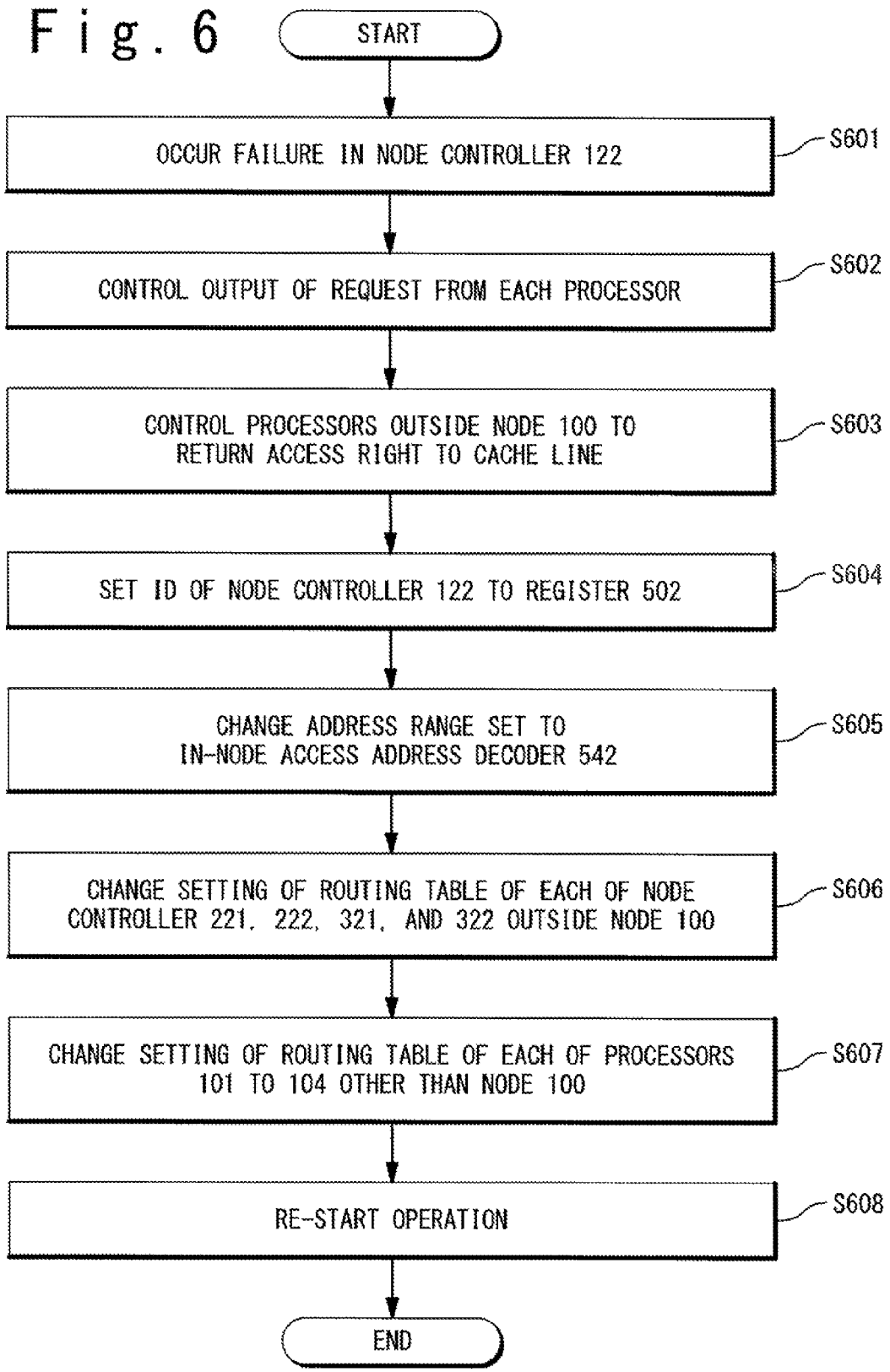
FIG. 6 is a flow chart showing an operation flow of the node controller failure time in the multiprocessor according to the present exemplary embodiment.

Next, an operation method in the multiprocessor system according to the present exemplary embodiment will be described. First, the operation method at the failure time of the node controller in the multiprocessor system according to the present exemplary embodiment will be described with reference to FIG. 6. FIG. 6 is an operation flow at the failure time of the node controller in the multiprocessor system according to the present exemplary embodiment. A case where a failure occurs in the controller 122 of the node 100 will be described.

(Step S601)

When a failure occurs in the node controller 122, the node controller 122 notifies the failure to system firmware. The system firmware is software operating on the multiprocessor, and controls the multiprocessor system.

(Step S602)

When the failure of the node controller 122 is detected, the system firmware suppresses a request from being outputted from each processor of the nodes 100, 200, and 300.

(Step S603)

The system firmware controls an access right to the cache line to be returned to the processor outside the node 100. The system firmware performs a control in such a manner that the data cached by the processor outside the node 100 is written back to the memories 111 to 114 based on cache statuses of the memories 111 to 114 in the node 100 for the processor provided outside the node 100. At this time, the cache statuses are recorded in the directories 523 and 543 of the node controller 121 and the directories 523 and 543 (hereinafter, to be referred to as directories 523B and 543B) of the node controller 122. Also, the system firmware performs a control in such a manner that the access right to the cache lines of the memories 111 to 114 is returned to the processor outside the node 100. Thereby, the data of the memories 111 to 114 in the node 100 can be updated to the latest state and coherency thereof can be guaranteed. It should be noted that the directories 523 and 543 of the node controller 121 and the directories 523B and 543B of the node controller 122 are recorded with the caching statuses by the processors outside the node 100 in order to guarantee coherency between the respective nodes. Therefore, even if any of the processors in the node 100 caches the data of the memories 111 to 114, there is no problem.

(Step S604)

The node controller 121 changes an ID data set in the register 502 of the distribution control register section 500 into the ID data of the node controller 122. Thereby, a request addressed to the node controller 122 is transferred to the request control section 509. Specifically, the request addressed to the node controller 121 is outputted to the request control section 508, and the request addressed to the node controller 122 is outputted to the request control section 509. It should be noted that in the present exemplary embodiment, though the ID data set in the register 502 is changed, the ID data set in the register 501 can be also changed to the ID data of the node controller 122. In this case, the request addressed to the node controller 122 is transferred to the request control section 508.

(Step S605)

The node controller 121 changes an address range for an in-node access address decoder 542 provided in the request control section 509 of the node controller 121, so as to contain an address range processed by the node controller 122. Because requests addressed to the node controller 122 are distributed to the request control section 509, the address range of the in-node access address decoder 542 is changed to contain the address range handled by the node controller 122.

As a result, even if a request addressed to the node controller 122 is transferred to the request control section 509, the in-node access address decoder 542 can determine a transmission destination ID data based on the address range handled by the node controller 122. It should be noted that the out-of-node access address decoder 532 is same between the node controller 121 and the node controller 122, and therefore, there is no need to execute any particular corresponding process.

(Step S606)

The system firmware changes the setting of the routing tables provided in the node controllers 221, 222, 321, and 322 other than the node controllers 121 and 122 so that the tables outputs routes not passing through the degenerated node controller 122. For example, when an access is made from the node controller 222 to the node controller 121, if the route is set from the node controller 222 to the node controller 121 though the node controller 122, the route is changed from the node controller 222 to the node controller 121 through the node controller 221.

Further, the setting of the routing table is changed so that access to the ID data of the node controller 122 is transferred to the node controller 121. By changing the setting in this way, a request addressed to the node controller 122 is transferred to the node controller 121. The node controller 121 is set to such a state that the request addressed to the node controller 122 is processed by the request control section 509. Therefore, the node controller 121 receives and processes the request addressed to the node controller 122.
(Step S607)

The processors 101 to 104 in the node 100 change the setting of the routing table so that the access to the node controller 122 becomes an access to the node controller 121. The signal line corresponding to the ID data of the node controller 122 is changed to the signal line connected to the node controller 121. By changing the signal line in this manner, the request addressed to the node controller 122 is outputted onto the signal line connected to the node controller 121, and is processed by the request control section 509 of the node controller 121.
(Step S608)

The system firmware releases the suppression of the output of the requests to the nodes 100, 200, and 300. After that, the multiprocessor system starts again.

As described above, the multiprocessor system according to the present exemplary embodiment operates at the failure time of the node controller. In this manner, in the multiprocessor system according to the present exemplary embodiment, at the failure time of the redundant node controller 122, the node controller 121 can process the request addressed to the node controller 122 by, setting the ID data of the node controller 122 in the internal register 502. Therefore, it is possible to start the system again just by changing the setting of the routing table provided in the processors 101 to 104 in the node 100 and the routing table provided in the node controllers 221, 222, 321, and 322 of the other nodes 200 and 300 in such a manner that the request addressed to the node controller 122 is transmitted to the node controller 121. Therefore, as compared with the case where the address decoder of each node is rewritten in order to rewrite the transmission destination ID data itself of the request, the system can be started again within a short period of time.

Figure 7B:
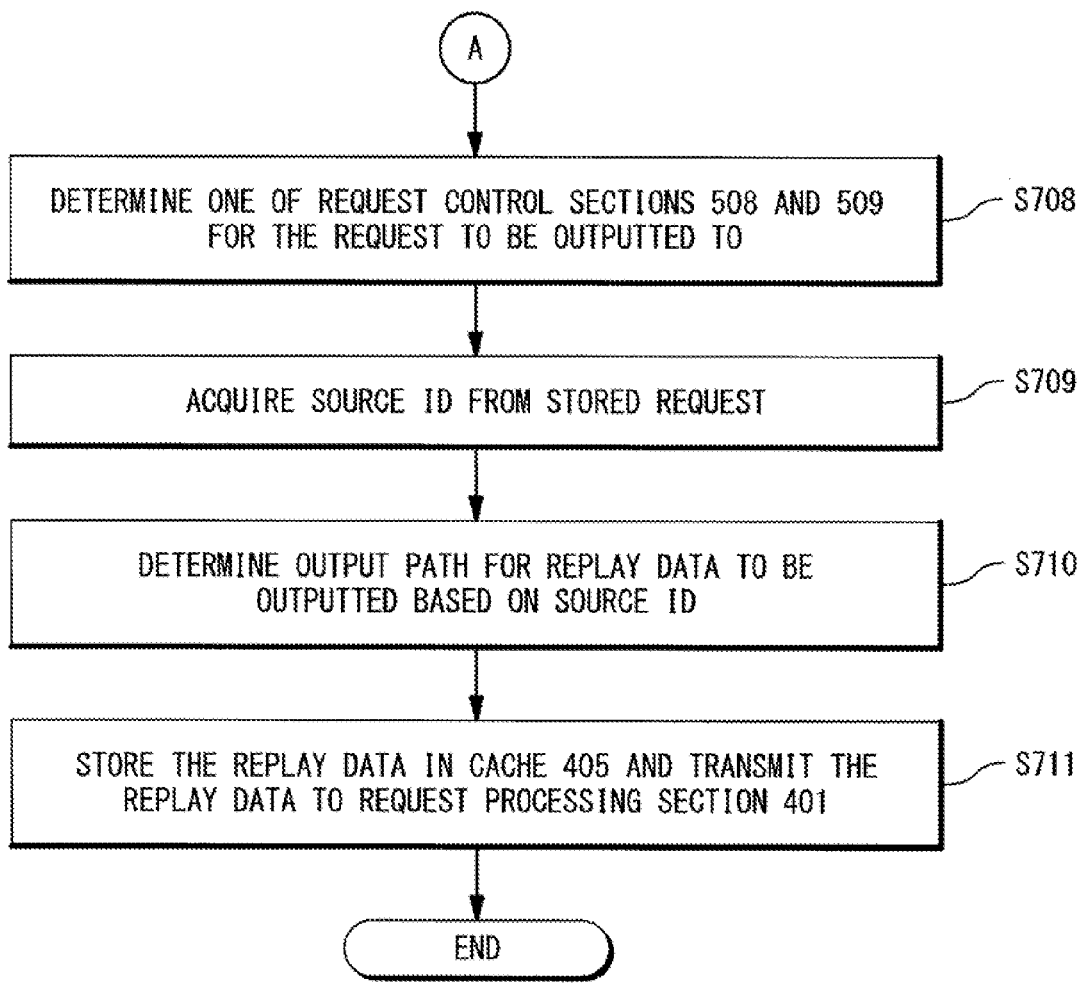

Next, the operation method of the node controller will be described when the request is received from an internal section of the node in the multiprocessor system according to the present exemplary embodiment with reference to FIGS. 7A and 7B. A case where a read request is issued from the processor 101 of the node 100 to the memory 214 of the node 200, that is, the case where the processor 101 in the node 100 accesses to the memory 214 outside the node 100 will be described below.
(Step S701)

The processor 101 receives a data request from a process operating on the processor 101. The request processing section 401 of the processor 101 generates a command for caching data recorded in the memory 214 of the node 200. The cache control section 402 generates a read request based on the command generated by the request processing section 401.
(Step S702)

The processor 101 determines a transmission destination ID data of the request based on an access destination address included in the read request by referring to the address decoder 403. It should be noted that in this example, since the destination address is on the memory 241 in the node 200, the processor 101 determines the transmission destination ID data as an ID data of the node controller 121.
(Step S703)

The processor 101 determines a signal line for the read request to be outputted onto based on the determined transmission destination ID data of the address decoder 403 by referring to the routing table 404. The crossbar 406 outputs the read request onto the signal line specified by the routing table 404. In this example, since the transmission destination ID data is the ID data of the node controller 121, the processor 101 determines the signal line for the read request to be outputted onto as the signal line 151.
(Step S704)

The node controller 121 receives the read request from the processor 101 by the crossbar 505. The node controller 121 determines whether the read request is to be outputted to the request control section 508 or 509 by referring to routing data set in the routing table 504 and the data set in the registers 501 to 503 of the request distribution data register section 500.

The routing table 504 can obtain ID data set in the registers 501 and 502 from the request distribution data register section 500. The node controller 121 outputs the read request to the request control section 508 when the transmission destination ID data included in the read request is coincident with data set in the register 501. On the other hand, the node controller 121 outputs the read request to the request control section 509 when the transmission destination ID data thereof is coincident with data set in the register 502. When the transmission destination ID data thereof is coincident with data set in both of the registers 501 and 502, the node controller 121 performs address interleaving based on data set in the register 503, and determines whether the request is to be outputted to the request control section 508 or 509. Further, when the transmission destination ID data thereof is not coincident with data in any of the register 501 and 502, the node controller 121 determines that the request is to be addressed to another node controller or processor and determines the destination by referring to the routing data set in the routing table 504. The crossbar 505 outputs the read request to the output destination determined by the routing table 504. It should be noted that in this example, the node controller 121 determines the out-of-node memory access control section 510 of the request control section 508 as the output destination of the request.
(Step S705)

The node controller 121 determines a transmission destination ID data of the read request. The out-of-node memory access control section 510 of the request control section 508 receives the read request from the crossbar 504. The out-of-node memory access control section 510 stores the read request into the out-of-node memory access request storage buffer 511. The out-of-node memory access control section 510 outputs the read request to the crossbar 507. Further, at the same time, the out-of-node memory access control section 510 determines the node controller 222 as the transmission destination of the read request based on the access destination address of the read request by referring to the out-of-node access address decoder 512, and outputs the transmission destination ID data of the node controller 222 to the crossbar 507. It should be noted that in this example, the node controller 222 determines the ID data of the node controller 221 of the node 200 as the transmission destination ID data since the access destination address is included in the memory 214 of the node 200.
(Step S706)

The crossbar 507 receives the transmission destination ID data from the out-of-node access address decoder 512. Further, the crossbar 507 receives the read request from the out-of-node memory access request storage buffer 511. The node controller 121 determines a signal line for the read request to be outputted onto based on the transmission destination ID data by referring to the routing data set in the routing table 506. The crossbar 507 outputs the read request onto the determined signal line 22. It should be noted that in this example, the routing table 506 specifies the output line 22 as an output destination of the read request since the transmission destination ID data is the ID data of the node controller 221. The crossbar 507 outputs a request 22 to the output line 22.

(Step S707)

A process is executed on the node 200, and a reply data is received from the memory 214. The node controller 221 of the node 200 receives the read request from the node controller 121 of the node 100. A description of the subsequent operation will be omitted since it is the operation of the other node. After this, the read request is transferred to the node controller 222 in the node 200. The node controller 222 confirms the cache statuses of the data of the memory 214. The read request is transmitted to the processor 204, and an access is carried out from the processor 204 to the memory 214. Data in the access destination address of the memory 214 is transmitted to the node controller 121 through the route at the transmission time as a reply data.

(Step S708)

The node controller 121 transfers the reply date from the memory 214 to the crossbar 505. The node controller 121 determines whether the reply data is to be outputted to the request control section 508 or 509 by referring to the routing data set in the routing table 504 and the data set in each register of the request distribution data register section 500. This process is the same as the process described in the step S704, and therefore, the repetitive description thereof will be omitted. It should be noted that in this example, the node controller 121 determines the output destination of the reply data as the out-of-node memory access control section 510 of the request control section 508. The crossbar 505 outputs the reply data to the output destination specified by the routing table 504.

(Step S709)

The out-of-node memory access control section 510 determines an ID data of the processor 101 as the request source of the reply data based on the read request stored in the out-of-node memory access request storage buffer 511 when the reply data is sent from the crossbar 505. The out-of-node memory access control section 510 outputs the reply data together with the ID data of the processor 101 to the crossbar 507.

(Step S710)

The crossbar 507 receives the reply data from the out-of-node memory access control section 510. The node controller 121 determines a signal line for the reply data to be outputted onto based on the ID data of the request source by referring to the routing data set in the routing table 506. The crossbar 505 outputs the reply data to the signal line specified by the routing table 506. It should be noted that in this example, the node controller 121 determines as the signal line of the reply data, the signal line 151 corresponding to the ID data of the processor 101 as the request source. The crossbar 505 outputs the reply data to the signal line 151.

(Step S711)

The crossbar 406 of the processor 101 receives the reply data from the signal line 151. The crossbar 406 outputs the reply data to the cache control section 402. The cache control section 402 stores the reply data in the cache memory 405, and at the same time, outputs the reply data to the request processing section 401. Thereby, the read request process is completed.

Figure 8C:
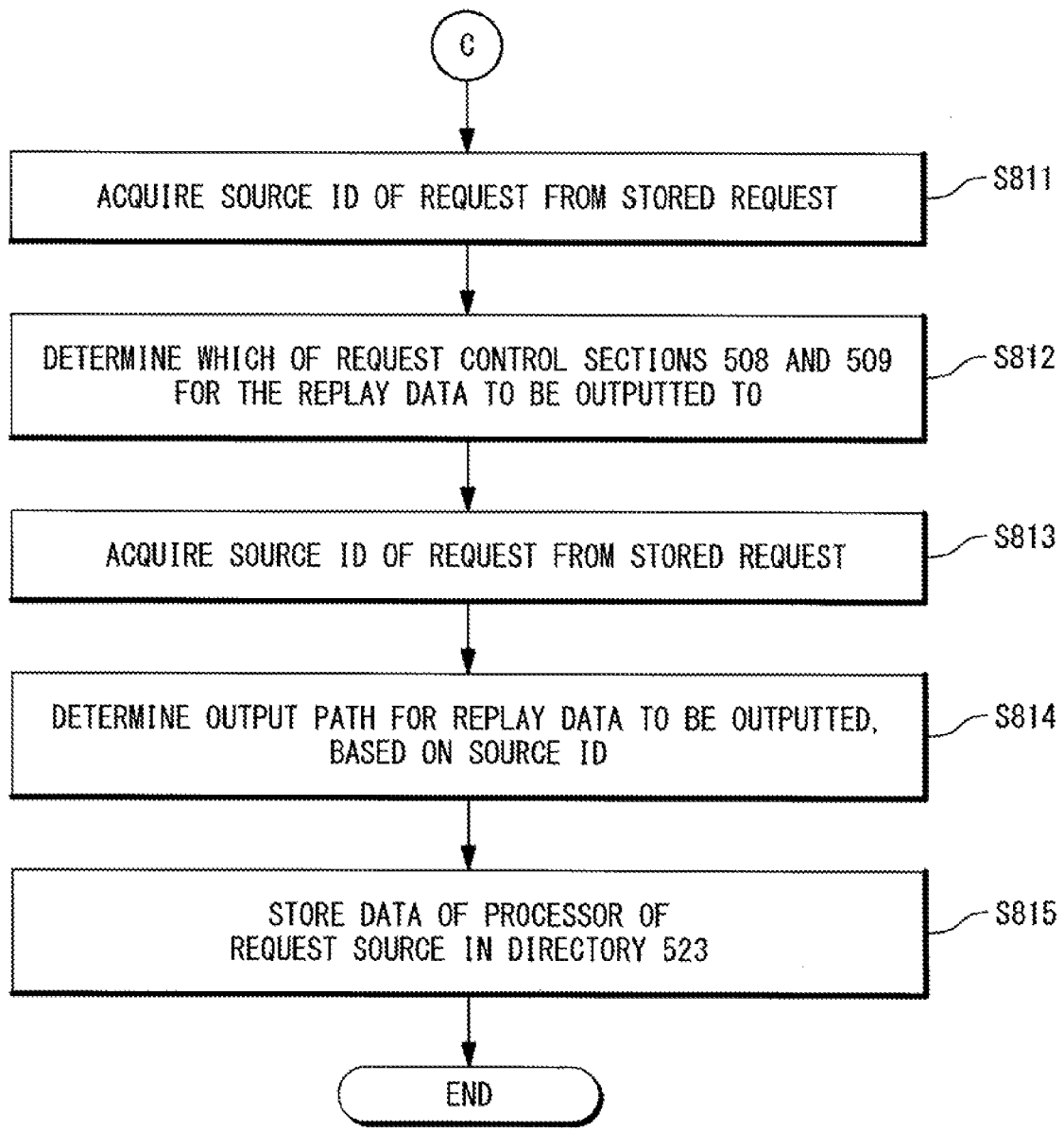

Next, the operation method of the node controller will be described when a read request is received from a unit outside the node in the multiprocessor system according to the present exemplary embodiment with reference to FIGS. 8A to 8C. A case where the read request is issued from the processor 204 of the node 200 to the memory 105 of the node 100, that is, the case where the processor 204 outside the node 100 accesses to the memory 105 in the node 100 will be described.

(Step S801)

The processor 204 of the node 200 issues a read request to the memory 111 of the node 100. This operation is the same as the process executed by the processor 101 in step S701 to step S703, and therefore, the description thereof will be omitted. The request outputted by the processor 204 is transferred to the node 100 through the node controller 221. The node controller 121 receives the read request issued from the processor 204 of the node 200 by the crossbar 505.

(Step S802)

The node controller 121 determines whether the read request is to be outputted to the request control section 508 or 509 based on the routing data set in the routing table 504 and data set in the registers 501 to 503 of the request distribution data register section 500. It should be noted that the operation in the present step is the same as that of the step S704, and therefore the repetitive description thereof will be omitted. In this example, the node controller 121 determines the in-node memory access control section 520 of the request control section 508 as the output destination of the read request. The crossbar 505 outputs the read request to the in-node memory access control section 520 of the request control section.

(Step S803)

The in-node memory access control section 520 confirms data cache statues of the memory 111. The in-node memory access control section 520 stores the read request into the in-node memory access request storage buffer 521 when the read request is sent from the crossbar 505. The in-node memory access control section 520 confirms a date cache status of the destination address included in the read request by referring to the directory 523.

(Step S804)

The in-node memory access control section 520 determines whether data in the destination address of the memory 111 included in the read request is in used for data cache by another processor. When not in use for data cache by the other processor, the operation flow advances to a step S805. On the other hand, when in use for data cache by the other processor, the operation flow advances to a step S807.

(Step S805)

The in-node memory access control section 520 outputs the read request to the crossbar 507 when the data in the access destination address of the read request is not cached by another processor. At the same time, the in-node memory access control section 520 determines the transmission destination ID data based on the access destination address of the read request by referring to the in-node access address decoder 522. The in-node memory access control section 520 outputs the transmission destination ID data to the crossbar 507. It should be noted that, in this example, since the read request is to the memory 111, the in-node memory access control section 520 determines an ID data of the processor 101 as the transmission destination ID data.

(Step S806)

The node controller 121 determines a signal line for the read request to be outputted onto. Specifically, the crossbar 507 receives the read request and the transmission destination ID data from the in-node memory access control section 520. The node controller 121 determines the signal line for the read request to be outputted onto by referring to the routing table 506. The crossbar 507 outputs the read request to the signal line of the output destination specified by the routing table 506. It should be noted that in this example, the node controller 121 determines the signal line 151 connected to the processor 101 as the signal line for the read request to be outputted. The crossbar 507 outputs the read request to the signal line 151.
(Step S807)

The in-node memory access control section 520 generates a snoop for requesting the return of an access right of the memory 111 when data in the access destination address of the read request is cached by the other processor.
(Step S808)

The in-node memory access control section 520 determines the transmission destination ID data of the processor performing the snoop. The in-node memory access control section 520 determines an ID data of the processor which caches the data in the access destination address, by referring to the directory 523. The in-node memory access control section 520 outputs the snoop and the transmission destination ID data to the crossbar 507.
(Step S809)

The crossbar 507 receives the snoop and the transmission destination ID data from the in-node memory access control section 520. The node controller 121 determines a signal line for the snoop to be outputted based on the transmission destination ID data by referring to the routing table 506. The crossbar 507 outputs the snoop to the signal line specified by the routing table 506.
(Step S810)

The in-node memory access control section 520 executes a predetermined process according to need upon receipt of the reply of the snoop. Here, the predetermined process means a process to generate a write request to the memory 111, transmit/receive the data, and update the directory 523 or the like. In this manner, the in-node memory access control section 520 executes various processes according to the reply of the snoop. However, since these processes are based on the conventional technique, detailed description thereof will be omitted. It should be noted that after this operation, the node controller 121 executes the same process as step S805 and step S806. The in-node memory access control section 520 determines the transmission destination ID data of the read request (step S805). The node controller 121 determines a signal line for the read request to be outputted, and the crossbar 507 outputs the read request to the signal line 151 (step S806). After that, the operation flow advances to step S811.
(Step S811)

The processor 101 receives the read request outputted from the crossbar 507. The processor 101 transfers the read request to the memory 111. The processor 101 obtains the data in the access destination address from the memory 111, and outputs a reply data including the data to the node controller 121.
(Step S812)

The node controller 121 determines whether the read request is to be outputted to the request control sections 508 or 509. The node controller 121 transfers the reply data from the processor 101 to the crossbar 505. The node controller 121 determines whether the read request is to be outputted to the request control section 508 or 509, by referring to the routing data set in the routing table 504 and data of each register of the request distribution data register section 500. The crossbar 505 outputs the reply data to an output destination specified by the routing table 504. It should be noted that the operation in a preset step is the same as step S704, and therefore, the repetitive description thereof will be omitted. It should be noted that in this example, the node controller 121 determines the in-node memory access control section 520 of the request control section 508 as the output destination of the reply data. The crossbar 505 outputs the reply data to the in-node memory access control section 520.
(Step S813)

The in-node memory access control section 520 obtains an ID data of the request source from the stored read request. When the reply data is sent from the crossbar 505, the in-node memory access control section 510 determines a transmission destination ID data of the reply data based on the read request stored in the in-node memory access request storage buffer 521 and the ID data of the processor of the request source. The out-of-node memory access control section 510 outputs the reply data to the crossbar 507 together with the transmission destination ID data. It should be noted that in this example, the in-node memory access control section 510 determines an ID data of the node controller 221 as the transmission destination ID data of the reply data based on the processor ID data of the request source.
(Step S814)

The node controller 121 determines a signal line for the reply data to be outputted. The crossbar 507 receives the reply data and the transmission destination ID data from the in-node memory access control section 520. The node controller 121 determines a signal line for the reply data to be outputted onto based on the transmission destination ID data by referring to the routing table 506. In this example, the node controller 121 determines as the signal line of the reply data, a signal line 22 corresponding to the ID data of the node controller 221. The crossbar 505 output the reply data to the signal line 22.
(Step S815)

The in-node memory access control section 520 records the data of the processor 204 of the request source in the directory 523. The in-node memory access control section 520 records in the directory, the data of the processor 204 which hands over the access right of the cache line. Thereby, a process of the node controller 121 for the read request from the processor 204 is completed. It should be noted that the processor 204 receives the reply data through the node controller 221, and records the data in the cache memory of the processor 204, and at the same time, outputs the data to the request processing section so as to complete the read request.

The above is the description of the operation method of the node controller when the request is received from outside the node in the multiprocessor system according to the present exemplary embodiment.

According to the present invention having been described up to here, each of node controllers of each node includes two request control sections for data processing, and two registers which store the ID data for determining which of two request control sections the data is to be transferred to. At the failure time of one node controller, an ID data of the node controller degenerated by a failure is set in one register of the node controller in a normal state. Further, data set in each node controller outside the node and a routing table of each processor in the node is changed such that a request addressed to the node controller in the failure state is transferred to the node controller in the normal state. Thereby, the node controller in the normal state receives the request addressed to the node controller in the failure state, and a process can be executed by one request control section. In this manner, the request addressed to the node controller in the failure state can be processed by the node controller in the normal state, and therefore, there is no need to make a setting change of the address decoder in each of the node controllers of the other nodes and each processor. Therefore, a system stop time of the multiprocessor system can be made short at failure occurrence.

Figure 9:
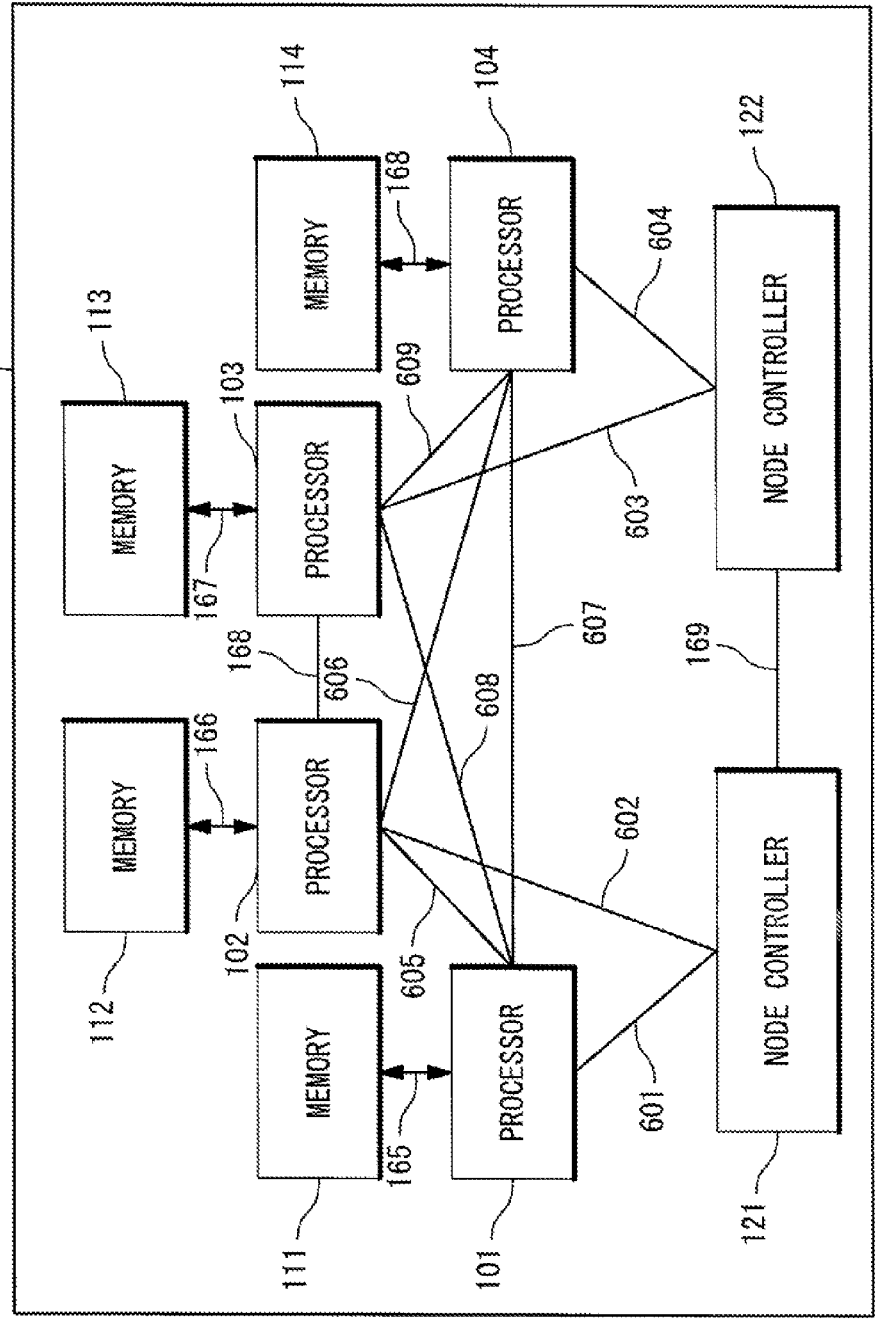
FIG. 9 is a block diagram showing a modification example of the connection configuration in the node in the present exemplary embodiment.

It should be noted that the connection between each node controller and each processor in the node 100 (representative of other nodes) is not limited to the connection configuration shown in FIG. 1. FIGS. 9 and 10 are views showing modification examples of the connection configuration in the node 100 of the present exemplary embodiment. For example, as shown in FIG. 9, every two processors may be not mutually connected in one-to-one correspondence similarly to the connection by signal lines 601 to 609 or may be a connection configuration by a bus 700 as shown in FIG. 10.

Further, the node controller 121 (representative of the node controllers) includes four address decoders 512, 522, 532, and 542. This is because the out-of-node access address decoders 512 and 532 are address decoders specifying the node controllers 221, 222, 321 and 322, and the in-node access address decoders 522 and 542 are address decoders specifying the processors 101 to 104 in the node 100. However, there is a case that the out-of-node access address decoders 512 and 532 are address decoders able to handle the processors 201 to 204 and 301 to 304 provided in the nodes 200 and 300 outside the node 100. In this case, the ID data of the processor as the output destination outputted from the node controller 121 is known when accessing to an internal unit of the node, and therefore, the configuration may be adopted not to have the in-node access address decoders 522 and 542.

While the present invention has been described by referring to the exemplary embodiments, it could be understood that the invention is not limited by the above described exemplary embodiments. It would be appreciated to those skilled in the art that various modifications can be made without departing from the scope of the present invention.

What is claimed is:

1. A multiprocessor system comprising a plurality of nodes,
   wherein each of said plurality of nodes comprises a plurality of processors, a plurality of memories respectively connected to said plurality of processors, and first and second node controllers provided for a redundant configuration and connected with said plurality of processors,
   wherein unique identifiers are assigned to said plurality of processors, said first node controller and said second node controller in each node, and
   wherein each of said first node controller and said second node controller comprises:
   a first request control section configured to determine the identifier of a transmission destination of a request based on a memory address of an access destination of said request;
   a second request control section configured to determine the identifier of the transmission destination of said request based on the memory address of the access destination of said request;
   a first register configured to hold the identifier of the transmission destination of said request such that said request is outputted to said first request control section;
   a second register configured to hold the identifier of the transmission destination of said request such that said request is outputted to said second request control section;
   a first routing table configured to specify one of said first request control section and said second request control section as an output destination of said request based on the identifier held by said first register, the identifier held by said second register, the identifier of the transmission destination of said request, when receiving said request; and
   a second routing table configured to specify a signal line for the identifier of the transmission destination of said request based on the identifier of the transmission destination which is determined by said first request control section or said second request control section, to transmit said request.

2. The multiprocessor system according to claim 1, wherein said first routing table checks whether the identifier of the transmission destination of said request is coincident with the identifier held by said first register or the identifier held by said second register, determines said first request control section corresponding to said first register as the output destination of said request when the identifier of the transmission destination of said request is coincident with the identifier held by said first register, and determines said second request control section corresponding to said second register as the output destination of said request, when the identifier of the transmission destination of said request is coincident with the identifier held by said second register.

3. The multiprocessor system according to claim 2, wherein said first node controller of said each node sets the identifier of said second node controller to said second register, when a failure has occurred in said second node controller.

4. The multiprocessor system according to claim 3, wherein each of said plurality of processors of each node comprises a processor routing table configured to specify the identifier of the transmission destination of said request,
   wherein each processor of a failure node as one node of said plurality of nodes in which a failure has occurred, changes setting of said processor routing table so as to output said request destined to said second node controller of said failure node to said first node controller of said failure node, and
   wherein each of said first node controller and said second node controller in each of said plurality of nodes other than said failure node changes setting of said second routing table so as to output said request destined to said second node controller of said failure node to said first node controller of said failure node.

5. The multiprocessor system according to claim 4, wherein each of said first and second request control sections comprises:
   an address decoder configured to determine the identifier of the transmission destination of said request based on the memory address of the access destination of said request, and
   wherein said first request control section of said failure node changes setting of an address range of the memory address of said address decoder of said first request control section so as to contain a range of the memory address of said address decoder of said second request control section.

6. The multiprocessor system according to claim 2, wherein each of said first and second node controllers further comprises:
   a third register configured to hold a bit location to be referred, of the identifier of the transmission destination of said request, and
   wherein each of said first and second routing tables specifies one of said first request control section and said second request control section as the output destination of said request based on the bit location held by said third register, when the identifier of the transmission destination of said request contains is coincident with both of the identifier held by said first register and the identifier held by said second register.

7. The multiprocessor system according to claim 6, wherein each of said first and second routing tables refers to said routing table to determine the transmission destination, when the identifier of the transmission destination of said request is not coincident with neither of the identifier held by said first register or the identifier held by said second register.

8. A node controller assigned with a unique identifier and provided for a node, comprising:
   a first request control section configured to determine the identifier of a transmission destination of a request based on a memory address of an access destination of said request;
   a second request control section configured to determine the identifier of the transmission destination of said request based on the memory address of the access destination of said request;
   a first register configured to hold in said first request control section, the identifier of the transmission destination of said request to be outputted,
   a second register configured to hold in said second request control section, the identifier of the transmission destination of said request to which said request should be outputted;
   a first routing table configured to specify one of said first request control section and said second request control section as an output destination of said request based on the identifier held by said first register, the identifier held by said second register, the identifier of the transmission destination of said request, when receiving said request; and
   a second routing table configured to specify a signal line for the identifier of the transmission destination of said request based on the identifier of the transmission destination which is determined by said first request control section or said second request control section, to transmit said request, and
   wherein each of said plurality of nodes comprises said plurality of processors, a plurality of memories respectively connected to said plurality of processors, and first and second node controllers provided for a redundant configuration and connected with said plurality of processors, and identifiers are assigned to said plurality of processors, said first node controller and said second node controller in each node.

9. A failure recovering method in a multiprocessor system which comprises a plurality of nodes, wherein each of said plurality of nodes comprises a plurality of processors, a plurality of memories respectively connected to said plurality of processors, and first and second node controllers provided for a redundant configuration and connected with said plurality of processors, and wherein unique identifiers are assigned to said plurality of processors, said first node controller and said second node controller in each node,
   wherein said failure recovering method comprises:
   determining by a first request control section, the identifier of a transmission destination of a request based on a memory address of an access destination of said request;
   determining by a second request control section, the identifier of the transmission destination of said request based on the memory address of the access destination of said request;
   holding by a first register, in said first request control section, the identifier of the transmission destination of said request to which said request should be outputted;
   holding by a second register, in said second request control section, the identifier of the transmission destination of said request to which said request should be outputted;
   specifying by a first routing table, one of said first request control section and said second request control section as an output destination of said request based on the identifier held by said first register, the identifier held by said second register, the identifier of the transmission destination of said request, when receiving said request; and
   specifying by a second routing table, a signal line for the identifier of the transmission destination of said request based on the identifier of the transmission destination which is determined by said first request control section or said second request control section, to transmit said request.

10. The multiprocessor system according to claim 9, wherein said determining the output destination of said request comprises:
    checking whether the identifier of the transmission destination of said request is coincident with the identifier held by said first register and the identifier held by said second register;
    determining said first request control section corresponding to said first register as the output destination of said request when the identifier, of the transmission destination of said request is coincident with the identifier held by said first register; and
    determining said second request control section corresponding to said second register as the output destination of said request, when the identifier of the transmission destination of said request is coincident with the identifier held by said second register.

11. The failure recovering method according to claim 10, further comprising:
    setting the identifier of said second node controller to said second register, when a failure has occurred in said second node controller.

12. The failure recovering method according to claim 11, wherein each of said plurality of processors of each node comprises a processor routing table configured to specify an identifier of the transmission destination of said request,
    wherein said failure recovering method further comprises:
    changing setting of said processor routing table so as to output said request destined to said second node controller of said failure node to said first node controller of said failure node; and
    changing setting of said second routing table so as to output said request destined to said second node controller of said failure node to said first node controller of said failure node, and
    wherein each of said first node controller and said second node controller in each of said plurality of nodes other than said failure node out of said plurality of nodes.

13. The failure recovering method according to claim 12, wherein each of said first and second request control sections comprises:
    an address decoder configured to determine the identifier of the transmission destination of said request based on the memory address of the access destination of said request, and
    wherein said failure recovering method further comprises:
    changing setting of an address range of the memory address of said address decoder of said first request control section so as to contain a range of the memory address of said address decoder of said second request control section.

14. The failure recovering method according to claim 10, wherein each of said first and second node controllers further comprises:
   a third register configured to hold a bit location to be referred to in the identifier of the transmission destination of said request, and
   wherein said determining the output destination of said request comprises:
   specifying one of said first request control section and said second request control section as the output destination of said request based on the bit location held by said third register, when the identifier of the transmission destination of said request contains is coincident with both of the identifier held by said first register and the identifier held by said second register.

15. The failure recovering method according to claim 14, wherein said determining the output destination of said request comprises:
   referring to said routing table to determine the transmission destination, when the identifier of the transmission destination of said request is not coincident with neither of the identifier held by said first register nor the identifier held by said second register.

* * * * *